(12) United States Patent
Iben et al.

(10) Patent No.: US 8,089,722 B2
(45) Date of Patent: Jan. 3, 2012

(54) IN SITU RADIO FREQUENCY SHIELD FOR A MAGNETIC LINEAR RECORDING MEDIA HEAD

(75) Inventors: Icko E. T. Iben, Santa Clara, CA (US); Luis H. Palacios, Mountain View, CA (US); Andrew C. Ting, El Prado, NM (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 11/623,276

(22) Filed: Jan. 15, 2007

(65) Prior Publication Data

US 2008/0170335 A1    Jul. 17, 2008

(51) Int. Cl.
  *G11B 5/127* (2006.01)
  *G11B 21/02* (2006.01)
(52) U.S. Cl. ........................................ 360/121; 360/122
(58) Field of Classification Search .................. 360/122, 360/319, 121
  See application file for complete search history.

(56) References Cited

U.S. PATENT DOCUMENTS

| 4,797,767 | A | * | 1/1989 | Baus, Jr. ........................ 360/121 |
| 4,967,301 | A | * | 10/1990 | Lopez et al. ................... 360/128 |
| 5,055,969 | A | * | 10/1991 | Putnam ......................... 361/749 |
| 5,917,708 | A | | 6/1999 | Moran et al. |
| 6,097,570 | A | | 8/2000 | Dee |
| 6,246,553 | B1 | * | 6/2001 | Biskeborn ...................... 360/323 |
| 6,496,329 | B2 | * | 12/2002 | Hungerford et al. ........... 360/121 |
| 6,914,756 | B2 | * | 7/2005 | Molstad et al. ................ 360/316 |
| 7,009,819 | B2 | * | 3/2006 | Soda et al. ..................... 360/323 |
| 7,111,383 | B2 | * | 9/2006 | Henze et al. ................ 29/603.07 |
| 7,161,767 | B2 | * | 1/2007 | Hernandez et al. ......... 360/245.9 |
| 2008/0170335 | A1 | * | 7/2008 | Iben et al. ..................... 360/319 |

\* cited by examiner

*Primary Examiner* — Brian Miller
(74) *Attorney, Agent, or Firm* — Zilka-Kotab, PC

(57) ABSTRACT

A read/write head for magnetic tapes configured with an in situ radio frequency (RF) shield is provided. The RF shield of the invention inhibits device elements reading data from reading RF radiation irradiated by other device elements writing data. The RF shield may be situated between the device elements of one module and the device elements of a second module. The dimensions and materials of the RF shield may be selected depending upon the operating frequencies of the head and skin depth of materials comprising the RF shield. The data cable may be bonded to device element pads of a module using ACF bonding. AFC bonding the cable to the module may allow a metal ground plane on the cable to be extended to provide additional RF shielding.

21 Claims, 4 Drawing Sheets

IN SITU RADIO FREQUENCY SHIELD FOR A MAGNETIC LINEAR RECORDING MEDIA HEAD

BACKGROUND OF THE INVENTION

1. Field of the Invention

The present invention relates to flexible magnetic storage media heads, and more particularly, to an in situ radio frequency shield for a flexible magnetic storage media head.

2. Background Information

Business, science and entertainment applications depend upon computing systems to process and record data. In these applications, large volumes of data are often stored or transferred to nonvolatile storage media, such as magnetic discs, magnetic tape cartridges, optical disk cartridges, floppy diskettes, or floptical diskettes. Typically, magnetic tape is the most economical, convenient, and secure means of storing or archiving data.

Data storage technology is continually pushed to increase data storage capacity and storage reliability. Improvement in data storage densities in magnetic storage media, for example, has resulted from improved medium materials, improved error correction techniques and decreased areal bit sizes. The data storage capacity of half-inch magnetic tape, for example, is currently measured in hundreds of gigabytes.

In linear recording media, such as magnetic tapes, data is stored on linear data tracks that run parallel to each other over the length of the tape. The magnetic tape is transferred back and forth between supply and take-up reels for reading data from or writing data to the magnetic tape, by one or more read/write heads.

FIG. 1 illustrates a traditional bidirectional, two-module magnetic tape head 100, in accordance with the prior art. As shown, the head includes a pair of bases 102 that are typically elongated "U-beams". The bases are adhesively coupled together and a channel 104 is formed between the bases.

Each base is equipped with a module 106. Each module includes a substrate 106A in which read/write elements 108 are embedded. The modules are long enough to be able to support a tape 110 as the head steps between data tracks. A closure 106B may be added for reducing wear of the substrate. When provided, the closure 106B is adhered to the substrate using known methods.

The modules are aligned in the direction of tape travel D across the head for reading data as it is written to the tape 110. In use, the tape 110 is moved back and forth over the modules along a tape bearing surface 112 for reading and writing data on the tape.

The read/write elements alternate functionality depending upon the direction that the tape is traveling, so that a read element is downstream of a write element in the direction of tape travel. This allows data written to the tape to be immediately read back and checked for errors. The process of reading data as it is written to the tape is well known in the art as rear-while-write or read-modify-write.

A data cable 114 is bonded to each module for transferring data between the head and a controller (not shown). The data cable is typically bonded to device element pads 116 that are coupled to the read/write elements via device element leads 118 in the substrate to provide a data path between the read/write elements and controller. To bond the cable to the leads 118 of the data cable are first aligned with the device element pads that are located on the substrate. The leads are then ultrasonically welded or stitch bonded, to the pads for bonding the cable to the module. The cable then needs to be attached to the module with some form of strain relief, such as adhesively bonding the cable to the module.

However, several disadvantages are inherent in ultrasonically welding or stitch bonding. A known disadvantage of ultrasonic welding is that the leads in the cable are unsupported by the cable substrate, and extend beyond the substrate. The exposed leads are susceptible to mechanical damage which adds cost and decreases reliability of the head. A disadvantage common to both ultrasonic welding and stitch bonding, is that some form of strain relief is required, such as adhesively bonding the cable to the module. The strain relief necessitates an additional manufacturing step of the head. Another disadvantage of both ultrasonic welding and stitch bonding, is that the leads are exposed to potential shorting if an external metal RF shield is attached to the cable and placed over the leads.

Another method of bonding the cable leads to the conductive pads is anisotropic conductive film (ACF) bonding. ACF bonding uses an adhesive which has electrically conductive balls within it. The cable leads and the conductive pads on the substrate are first aligned with an ACF film sandwiched between them. The pads and leads are then pressed together at elevated temperature. This pressure results in the conductive balls being compressed to form electrical bonds between the appropriate leads and substrate pads. The conductive balls are sufficiently dense to provide electrical contact between the electrical leads and the substrate pads, while being disperse enough to avoid forming an electrical bridge between neighboring leads or pads. The elevated temperature results in the adhesive being cured to form a strong and permanent adhesive bond between the cable and the substrate.

ACF bonding provides advantages over the other noted bonding methods. With ACF bonding additional strain relief is not needed, as the adhesive in the ACF film serves the strain relief function. Further, the leads in the cable are supported by the cable substrate for reliability and inhibiting mechanically damaged cable. After ACF bonding the leads are not exposed, so the cable ground plane can extend over the leads.

A potential disadvantage of ACF bonding is that the closures are bonded using adhesives which have low glass transition temperatures (Tg). For example, one adhesive used in ACF bonding is 3M™ Scotch-Weld™ Epoxy Adhesive 2290 Amber, sold by 3M Corporation, which has a Tg of about 90° C. ACF bonding utilizes higher temperatures, and thus can heat the closure adhesive above its Tg. This can cause the closure to move relative to the substrate and become misaligned with respect to the substrate and the plane of the tape bearing surface (TBS). If the closure TBS is higher than the substrate TBS, then the magnetic field intensity measured by the readers embedded in the substrate will decrease for high density magnetic transitions written on the tape, known as Wallace spacing losses. With Wallace spacing losses, the signal decreases exponentially with the spacing between the readers and the tape surface. The write field intensity decreases similarly with distance with Wallace spacing losses.

The modules of the bi-directional read/write tape head described above are adjacent to one another. When writing data to the tape, a magnetic field is generated by one or more write elements to write the data to the tape. The radio frequency (RF) radiation of this magnetic field may be received by the read elements of the downstream module. The RF radiation received by the read elements is a source of noise that can interfere with the read elements reading the correct data from emanating the tape.

A prior art method of shielding the read elements from radio frequency radiation irradiated by the write elements, is to add an RF shield 120 between the two modules. In current computer storage magnetic tape devices, such as Linear Tape-Open (LTO) tape drives, manufactured by International Business Machines Corporation (IBM), Armonk, N.Y., a radio frequency (RF) shield 120 is positioned between the modules to reduce the amount of noise received by the read elements when writing data.

Typically, the RF shield comprises a metal foil, or sheet, and is affixed to the data cable coupled to one of the modules of the head. The RF shield is affixed to the data cable after the leads of the data cable are bonded to the device element pads on the substrate. The RF shield is positioned on the cable so that it extends into the channel between the two modules, but not above a plane of the TBS. Thus, the metal foil RF shield must be precision aligned on the cable, so that it approaches the TBS but does not protrude above the plane of the TBS. Once the foil is aligned on the cable, and thus the module, the RF shield is affixed to the cable. As can be appreciated, this process is labor intensive, and thus costly. Periodically, the RF shield is misaligned and either the costly module must be scrapped or the RF shield is realigned. Realignment of the RF shield involves pealing the adhesively bonded RF shield off the cable, which often damages the module by destroying the cable leads or causing electrostatic discharge damage (ESD) to the read devices.

Accordingly, there is a clearly-felt need in the art for a radio frequency shield for magnetic tape heads that provides sufficient RF signal blocking and is simple and cost effective to manufacture.

SUMMARY OF THE INVENTION

An embodiment of the invention comprises a read/write head for flexible magnetic storage media, such as magnetic tapes, configured with an in situ radio frequency shield. The in situ radio frequency (RF) shield of the invention inhibits read elements of the head from receiving RF radiation when data is being written by write elements of the head. RF radiation received by the read elements is a noise source that interferes with the read elements reading the correct data stored on the media and may damage the read elements over time.

In an exemplary embodiment, the read/write head of the invention includes a pair of modules positioned adjacent to one another. Each module includes a substrate with read and write elements. The read and write elements may be embedded in the substrate adjacent to a side of the substrate nearest to the other module. The RF shield may be positioned between the read and write elements embedded in each of the modules. In a preferred embodiment, the RF shield may be situated on the side of the substrate of one of the modules adjacent to the other module.

Optionally, a closure may be bonded to the module for reducing wear of the substrate. If a closure is provided, the RF shield may be positioned in situ between the closure and the read/write elements embedded in the substrate of the module. The closure may be bonded to the substrate to create a strong bond between the closure and substrate. This bond should be sufficiently strong to prevent the closure from moving relative to the substrate either during fabrication processes, such as when a data cable is bonded to the module, or during normal operation. Also, when necessary, the bond between the closure and substrate should maintain the closure at the same electrical potential as the substrate. This can be accomplished by etching through the layers of the substrate and forming a conductive post, to bond the closure to the substrate.

In an embodiment of the invention a selected one of two modules comprising the read/write head embodies the in situ RF shield. In an alternative embodiment, each module comprising the read/write head is configured with an RF shield. Providing each module with an RF shield may further minimize the RF radiation from write elements and the RF radiation received by the read elements of the head.

The dimensions and materials of the RF shield may be selected depending upon the operating frequencies of the head and skin depth of materials selected to comprise the RF shield. Preferably, the skin depth of the material comprising the RF shield is less than the thickness of the material at the operating frequency of the head.

The data cable is bonded to both modules comprising the head to provide a data path between the head and a controller. The data cable may be bonded to the modules using known methods, such as ultrasonic welding. In a preferred embodiment the data cable is bonded to device element pads of each module of the head using anisotropic conductive film (ACF) bonding. Using AFC bonding to bond the cable to the module, only a bonding surface of the cable leads needs be exposed, as opposed to leaving a substantial portion of the leads exposed, as found in the prior art. Resultantly, a metal ground plane on a back surface of the cable can be extended to cover the leads. Extending the metal ground plane may provide additional RF shielding for the device element pads and read/write elements of the head.

BRIEF DESCRIPTION OF THE DRAWINGS

Prior Art

DESCRIPTION OF THE PREFERRED EMBODIMENTS

Figure 1:
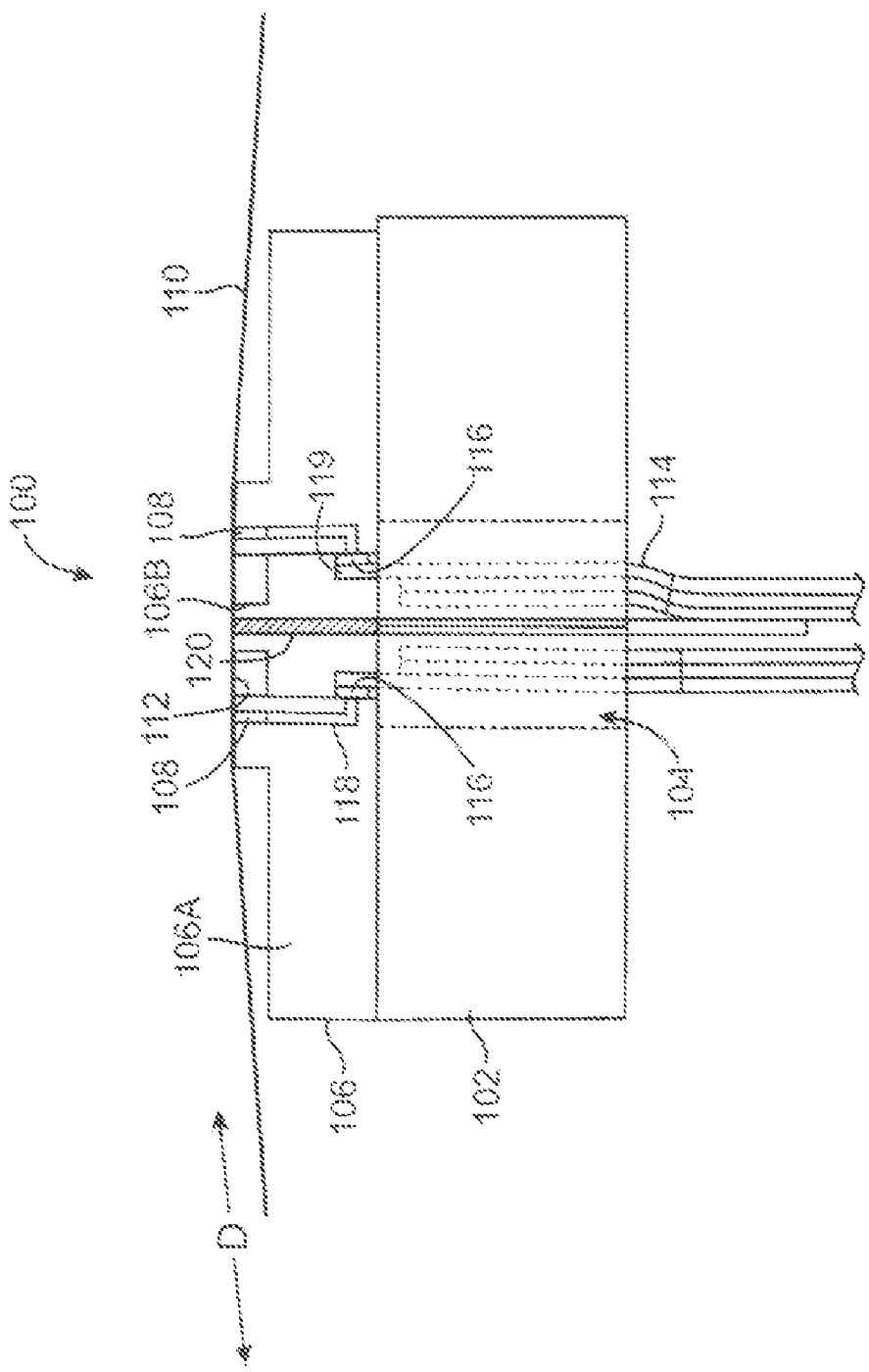
FIG. 1 is a side view of a traditional flat-lapped magnetic tape head, in accordance with the prior art.
Figure 2:
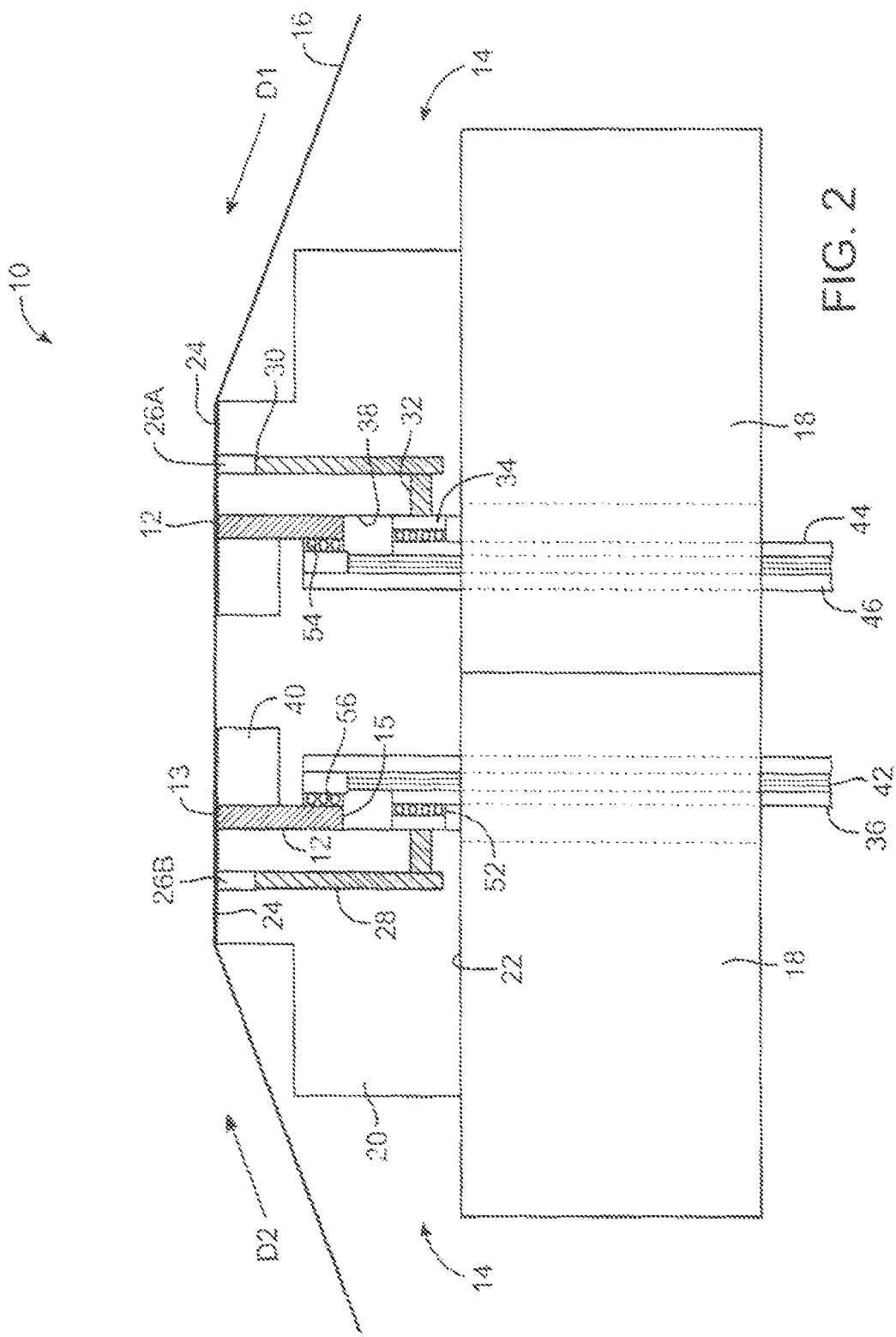
FIG. 2 is a cross-sectional side view showing a module of an embodiment of the read/write head of the invention.

Referring to FIG. 2 of the drawings, there is shown an exemplary embodiment of a read/write head of the invention 10. The invented read/write head 10 is configured with an in situ radio frequency (RF) shield 12 that inhibits device elements of the head 10 reading data from receiving radio frequency (RF) radiation when data is being written by other device elements of the head 10.

In the exemplary embodiment, the invented head 10 includes a pair of modules, shown generally at 14. However, in alternative embodiments, the head 10 may comprise more or less modules 14. The modules 14 are long enough to be able to support a tape 16 as the head 10 steps between data tracks (not shown) of the tape 16. A base 18 is adhered to each module 14, for supporting the module 14. The bases 18 are adhesively coupled together using known methods, such as gluing.

Each module 14 may include a wafer substrate 20 with a bottom surface 22 adhered to the base 18 and a top surface comprising a tape bearing surface 24. The wafer substrates 20 are preferably built using known methods such as thin-film fabrication techniques, for example. Using such techniques, the components comprising the substrate 20 are typically built in layers.

A plurality of device elements 26 may be formed in each wafer substrate 20 of the head 10 using the discussed techniques, with each substrate 20 having the same number of elements 26. The device elements 26 are provided to read data (reader) from and write data (writer) to the tape 16. The device elements 26 comprise any one of several known device element configurations for reading and writing data on a flexible magnetic storage media. Device element configurations common to read/write heads include side-by-side and piggy-back configurations. In either configuration, a first substrate 20 may be configured with read element 1, write element 2, read element 3, write element 4 . . . a second substrate would be configured with write element 1, read element 2, write element 3, read element 4 . . . such that read element n is aligned with write element n.

For "forward motion", write element 2n+1 (odd data tracks of the tape 16) will write data and read element 2n+1 will read the data written by write element 2n+1. For "reverse motion", write element 2n (even tracks of the tape 16) will write data and read element 2n will read the data written by write element 2n. In side-by-side configurations, the read elements and write elements are separated along the length of the module. In piggy-back configurations, the 2n+1 read elements and 2n write elements are aligned along the same track orientation as are write elements 2n+1 and read elements 2n.

A device element lead 28 is coupled to each device element 26 for transmitting data to and from the head 10. Each device element lead 28 comprises a conductive metal and is formed in the module 14 using known methods, such as by depositing or plating. A first end 30 of each lead 28 is coupled to a device element 26 and a second end 32 of the lead 28 is coupled to a device pad 34. At least two device element leads are required per device element 26.

Referring to FIG. 2 through FIG. 5, a plurality of device element pads 34 are provided for coupling a data cable 36 to the head 10 for transmitting data between the head 10 and a controller (not shown). The plurality of device element pads 34 may be formed on an end 38 of the wafer substrate 20. The device element pads 34 may comprise a conductive material, such as copper, and are formed on the end 38 of the substrate 20 during the fabrication process using known methods. The copper of the device element pads 34 can be coated with a nickel layer (not shown) to act as a barrier against moisture diffusion. If provided, the nickel layer may then be coated with a gold layer for the reduction of oxidation or corrosion inhibition. The device element pads 34 may be formed by disposing or plating the conductive material comprising the pads 34, then etching the end 38 to form the pads 34.

Referring to FIG. 2, the radio frequency (RF) RF shield 12 of the invented head 10 is positioned between the device elements 26 embedded in each of the modules 14. The RF shield 12 inhibits device elements 26 that are reading data from receiving RF radiation when other device elements 26 are writing data to the tape 16. The RF radiation received by device elements 26 reading data is a noise source that may prevent device elements 26 reading data from reading the correct data stored on the tape 16 and may damage the elements 26 over time.

Figure 3:
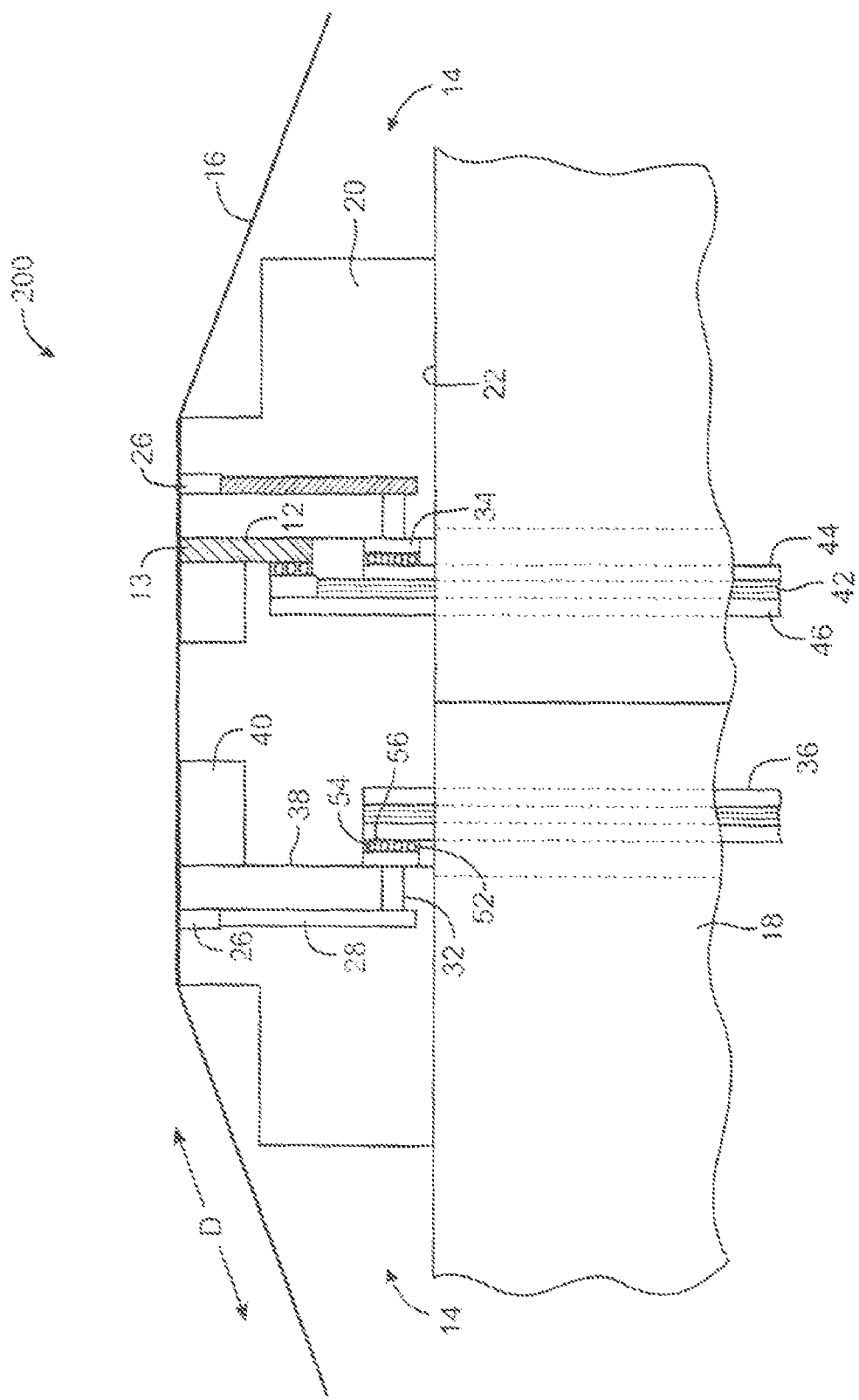
FIG. 3 is a cross-sectional side view showing an alternative embodiment of the read/write head of the invention.

In the exemplary embodiment, the RF shield 12 is positioned in situ on the end 38 of the wafer substrate 20 between adjacent modules 14. Each of the two modules 14 comprising the head 10 is built with an RF shield 12. In an alternative embodiment 200 as shown in FIG. 3, a selected one of the modules 14 is built with an RF shield 12. Configuring each module 14 with an RF shield 12 may substantially minimize the RF radiation emanating from device elements 26 writing data and the RF radiation received by the device elements 26 reading data.

The RF shield 12 is dimensioned depending upon an operating frequency of the head 10 and skin depth of materials selected to comprise the RF shield 12. Preferably, the skin depth of the materials selected to comprise the RF shield 12 is less than a thickness of the material at an operating frequency of the head 10.

For example, the material and the thickness thereof, selected to comprise the RF shield 12 is chosen such that the skin depth ($\delta$):

$$\delta = (2/\omega\sigma\mu_r)^{0.5}$$

where: $\omega$ is an operating frequency of the head 10
$\sigma$ is the conductivity of the material comprising the RF shield 12
$\mu_r$ is the relative permeability of the material comprising the RF shield 12.

Several examples of materials that may be used to build the RF shield 12 include Nickel, Iron, an 80/20 alloy of Nickel-iron, a 45/55 alloy of Nickel-iron, Sendust, an alloy of 79/16/5 NiFeMo, Gold, Copper, and Silver. For example, Nickel has a $\sigma$ of $1.3 \times 10^7$ mho/m and a $\mu_r$ of 100. At 1 MHz, the skin depth ($\delta$) of Nickel is 14 μm. In a preferred embodiment, the RF shield 12 is fabricated using either an alloy comprising 80/20 Nickel-iron or Sendust. The above mentioned metals and alloys are well known materials used in the manufacture of tape heads and thus are readily available.

The RF shield 12 may be built using methods known in the art and which may be determined by the material comprising the RF shield 12. For example, the RF shield 12 may be plated on the end 38 of the substrate 20 or may be deposited and etched, using methods known in the art. The RF shield 12 may be etched so that an upper edge 13 thereof is aligned with the tape bearing surface 24 of the module 14 and a lower edge 15 of the RF shield is proximal to the device element pads 34.

If a closure 40 is used, then the closure 40 is coupled to the module 14, with the RF shield 12 positioned between the closure 40 and the device elements 26 of the module 14. The closure 40 may be bonded to the substrate 20 using known methods that create a strong bond between the closure 40 and substrate 20. This bond should be sufficiently strong to prevent the closure from moving relative to the substrate 20 either during fabrication processes, such as when the data cable 36 is bonded to the module 14, or during normal operation.

Referring to FIG. 2 through FIG. 5, the data cable 36 is coupled to the device element pads 34 to provide a data path between the head 10 and controller. The data cable 36 may be coupled to the device element pads 34 using established methods, such as ultrasonic welding or gluing with a conductive adhesive.

In a preferred embodiment, the cable 36 is bonded to the device element pads 34 using anisotropic conductive film (ACF) bonding. Using AFC bonding, to bond the cable 36 to the device element pads 34, provides a cost efficient process to bond the cable 36 to the head 10 and provides a reliable bond, as compared to other known bonding methods. Since the ACF adhesive used to bond the cable 36 to the device element pads 34 also serves to bond the cable 36 to the module 14, the need for additional strain relief is obviated.

The cable 36 may comprise any suitable known data cable. Typically, the data cable 36 consists of a flexible substrate layer 42 with an inner conductive layer 44 and an outer conductive layer 46 that comprises a conductive ground plane.

The cable substrate layer 42 comprises a polymeric material, such as polyimide. The inner conductive layer 44 is made up of a plurality of conductive leads 48 for coupling to the plurality of device element pads 34, with one lead 48 provided for each pad 34. The inner conductive layer 44 may be any suitable material known in the art, such as copper for example.

The cable 36 is bonded to the device element pads 34, by first aligning a bonding surface 50 of each lead 48 with a device pad 34. An anisotropic conductive film (ACF) 52 that consists of conductive particles, such as small metal spheres 54, and an adhesive 56 is applied to at least one surface to be bonded, such as either the bonding surface 50 of a lead 48 or a device pad 34. Thermocompression, a combination of heat and pressure, is applied to the bonding surface 50 of the leads 48 and device element pads 34 to bond the leads 48 to the pads 34. During bonding, the spheres 54 are compressed to electrically couple the leads 48 to the pads 34. The spheres have a low enough density that they do not form a horizontally conductive bridge between neighboring leads 48 on the device element pads 34.

Figure 4:
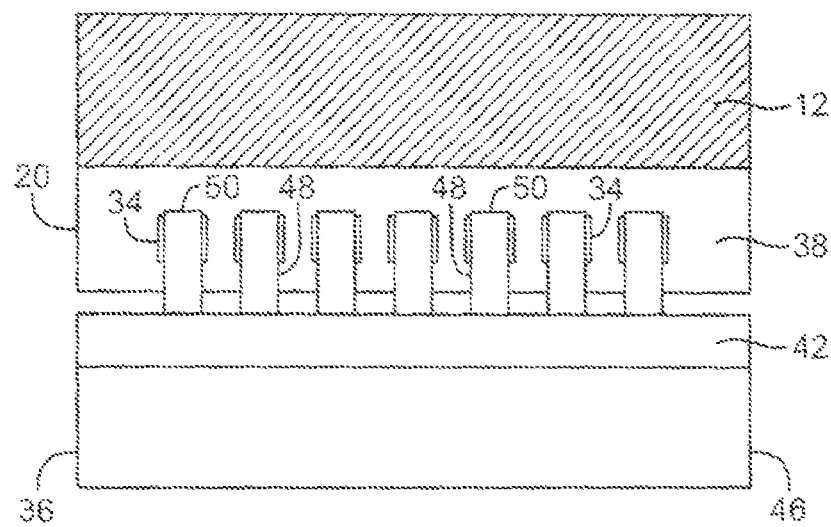
FIG. 4 is a fragmentary end view showing a data cable coupled to the read/write head of the invention.
Figure 5:
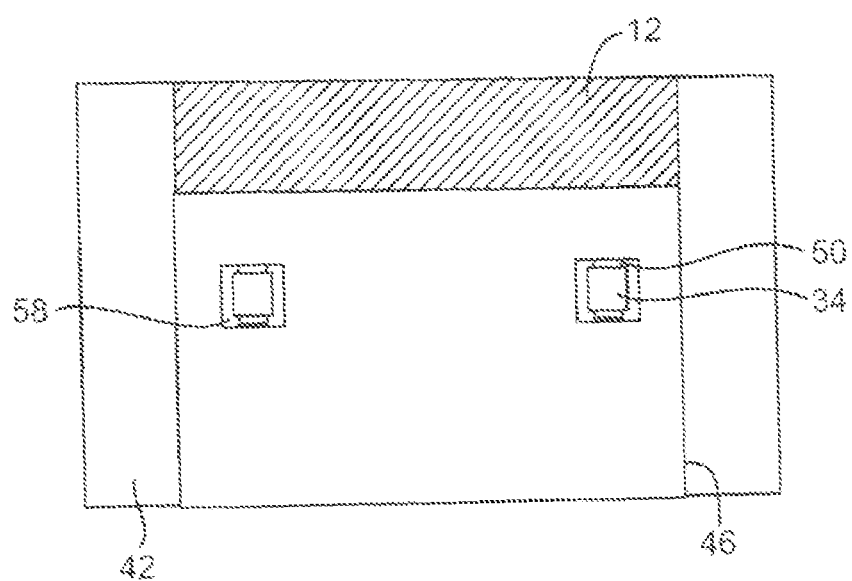
FIG. 5 is a fragmentary end view showing an alternative embodiment of the data cable coupled to the read/write head of the present invention.

As shown in FIG. 5, in an alternative embodiment, the ground plane 46 is configured to extend over the cable leads 48 and device element pads 34. Using ACF bonding to bond the cable 36 to the device element pads 34, only a bonding surface 50 of the cable leads 48 needs be exposed, as opposed to leaving a substantial portion of the leads 48 exposed, as found in the prior art, and as shown in FIG. 4. Thus, in the present invention, the ground plane 46 may be configured to extend over the cable leads 48 and device element pads 34. Extending the ground plane 46 over the leads 48 and pads 34 may provide additional RF shielding for the device element pads 34 and device elements 26 of the head 10.

When the ground plane 46 is configured to extend over the leads 48, alignment of the leads 48 with the device element pads 34 is substantially difficult. In this embodiment, one or more windows 58 may be formed in the ground plane 46. In a preferred embodiment, two windows 58 are formed in the ground plane 46. The windows 58 in the ground plane 46 enable visual alignment of the leads 48 with the device element pads 34. Once aligned, the leads 48 can be bonded to the pads 34 as discussed.

Optionally, the ground plane 46 may extend over the cable leads 48 and device element pads 34 and couple to the RF shield 12. Extending the ground plane 46 over the leads 48 and pads 34 can coupling the ground plane 46 to the RF shield 12 may provide further RF shielding for the device element pads 34 and device elements 26 of the head 10. In this embodiment, the ground plane 46 is preferably bonding to the RF shield 12 using ACF bonding, as discussed above. Bonding the ground plane 46 to the RF shield provide further RF shielding for the device element pads 34 and device elements 26 of the head 10.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A read/write head for magnetic storage media comprising:
   more than one module, a first of the modules comprising:
   a wafer substrate;
   at least one device element coupled to the substrate; and
   a radio frequency shield being a layer of the first module positioned between the at least one device element of the first module and the at least one device element of another one of the modules, the radio frequency shield decreasing a magnitude of radiation irradiated by a device element writing data received by a device element reading data,
   wherein a media-facing surface of the first module defined by the wafer substrate of the first module, the at least one device element of the first module and the radio frequency shield of the first module is contiguous in a direction of media travel thereover,
   wherein the first module further comprises a closure having a tape bearing surface and positioned on the first module to sandwich the radio frequency shield between the closure and the at least one device element of the first module.

2. The read/write head of claim 1 wherein the radio frequency shield is dimensioned depending upon an operating frequency of the head and skin depth of materials selected to comprise the radio frequency shield,
   wherein the material comprising the radio frequency shield comprises a selected one of a ferromagnetic and a conductive material.

3. The read/write head of claim 2 wherein at the operating frequency of the head, the skin depth of the material comprising the radio frequency shield is less than a thickness of the material.

4. A system having the read/write head of Claim 1 and further comprising a data cable in electrical communication with the at least one device element of the first module, the data cable having a ground plane, the ground plane being electrically coupled to the radio frequency shield.

5. A read/write head for flexible magnetic storage media comprising:
   more than one module coupled to a base, each module comprising;
   a wafer substrate formed with a tape bearing surface;
   at least one device element formed in the substrate and positioned at a plane of the tape bearing surface, the at least one device element for reading data from and write writing data to a flexible magnetic storage media depending upon a direction of travel of the media, as the media is transferred along the tape bearing surface;
   at least one device element pad coupled to the at least one device element; and
   a data cable coupled to the at least one device element pad, the data cable having a ground plane on a back surface thereof configured to extend over the at least one device element pad; and
   a radio frequency shield formed on at least one of the modules, the radio frequency shield formed on the wafer substrate and positioned in situ between the at least one device element of the module that the radio frequency shield is formed on and the at least one device element of another one of the modules, the radio frequency shield inhibiting radiation irradiated by the at least one device element writing data to the media from being received by the at least one device element reading data.

6. The read/write head of claim 5 wherein the radio frequency shield is dimensioned depending upon an operating frequency of the head and skin depth of materials selected to comprise the radio frequency shield.

7. The read/write head of claim 6 wherein a thickness of the material comprising the radio frequency shield is greater than the skin depth of the material at the operating frequency of the head.

8. The read/write head of claim 7 wherein the material comprising the radio frequency shield comprises conductive material is selected from the group consisting of copper, gold, aluminum, and silver.

9. The read/write head of claim 7 wherein the radio frequency shield comprises a lamination of selected one of magnetically permeable ferromagnetic materials and conductive materials.

10. The read/write head of claim 6 wherein the material comprising the radio frequency shield comprises a magnetically permeable ferromagnetic material.

11. The read/write head of claim 10 wherein the magnetically permeable ferromagnetic material comprising the radio frequency shield is selected from the group consisting of Nickel-Iron alloy, Sendust, copper alloy, gold alloy, and silver alloy.

12. The read/write head of claim 6 wherein the ground plane on the data cable is bonded to the radio frequency shield for inhibiting the at least one device element reading data from receiving noise generated by the at least one device element writing data to the media.

13. The read/write head of claim 5 wherein the radio frequency shield has an upper edge adjacent to the plane of the tape bearing surface.

14. The read/write head of claim 5 further comprising:
the data cable including more than one lead, the more than one lead of the data cable bonded to the at least one device element pad, such that a data cable lead is bonded to each device element pad, the more than one lead of the data cable bonded to the device element pads using an electrically conductive adhesive.

15. The read/write head of claim 14 wherein the ground plane on the data cable extends over the at least one device pad and data cable leads for inhibiting the data cable leads and device element pads from receiving noise generated by the at least one device element writing data to the media.

16. A read/write head for magnetic storage media comprising:
a pair of bases coupled together;
a module coupled to each base, each module comprising;
a wafer substrate formed with a tape bearing surface;
a plurality of device elements formed in the substrate and positioned at a plane of the tape bearing surface, the device elements adapted to read data from and write data to a magnetic storage media depending upon a direction of travel of the media;
a plurality of device element leads formed in the substrate, each device element lead coupled to a device element to provide an electrically conductive signal path;
a closure coupled to the wafer substrate, the closure having an upper surface aligned with the plane of the tape bearing surface;
a radio frequency shield formed on an end of the wafer substrate and positioned in situ between the device elements and closure, the radio frequency shield inhibiting radiation irradiated by one or more device elements writing data to the media from being received by one or more device elements reading data from the media;
a plurality of device element pads formed on the wafer substrate and coupled to the device element leads; and
a data cable bonded to the plurality of device element pads, the data cable including a plurality of leads for coupling to each of the plurality of device element pads, the data cable configured with a ground plane on a back surface thereof that extends over the plurality of device element pads for inhibiting the data cable leads and device element pads from receiving noise generated by a device element writing data to the media.

17. The read/write head of claim 16 wherein the radio frequency shield is dimensioned depending upon an operating frequency of the head and skin depth of materials selected to comprise the radio frequency shield.

18. The read/write head of claim 17 wherein a thickness of the material comprising the radio frequency shield is greater than the skin depth of the material at the operating frequency of the head.

19. The read/write head of claim 18 wherein the material comprising the radio frequency shield comprises a magnetically permeable ferromagnetic material selected from the group consisting of Nickel-Iron alloy, Sendust, copper alloy, gold alloy, and silver alloy.

20. The read/write head of claim 16 wherein the radio frequency shield has an upper edge aligned with the plane of the tape bearing surface.

21. The read/write head of claim 16 wherein leads of the data cable are bonded to the plurality of device element pads using anisotropic conductive film bonding.

* * * * *